Patented Nov. 23, 1948

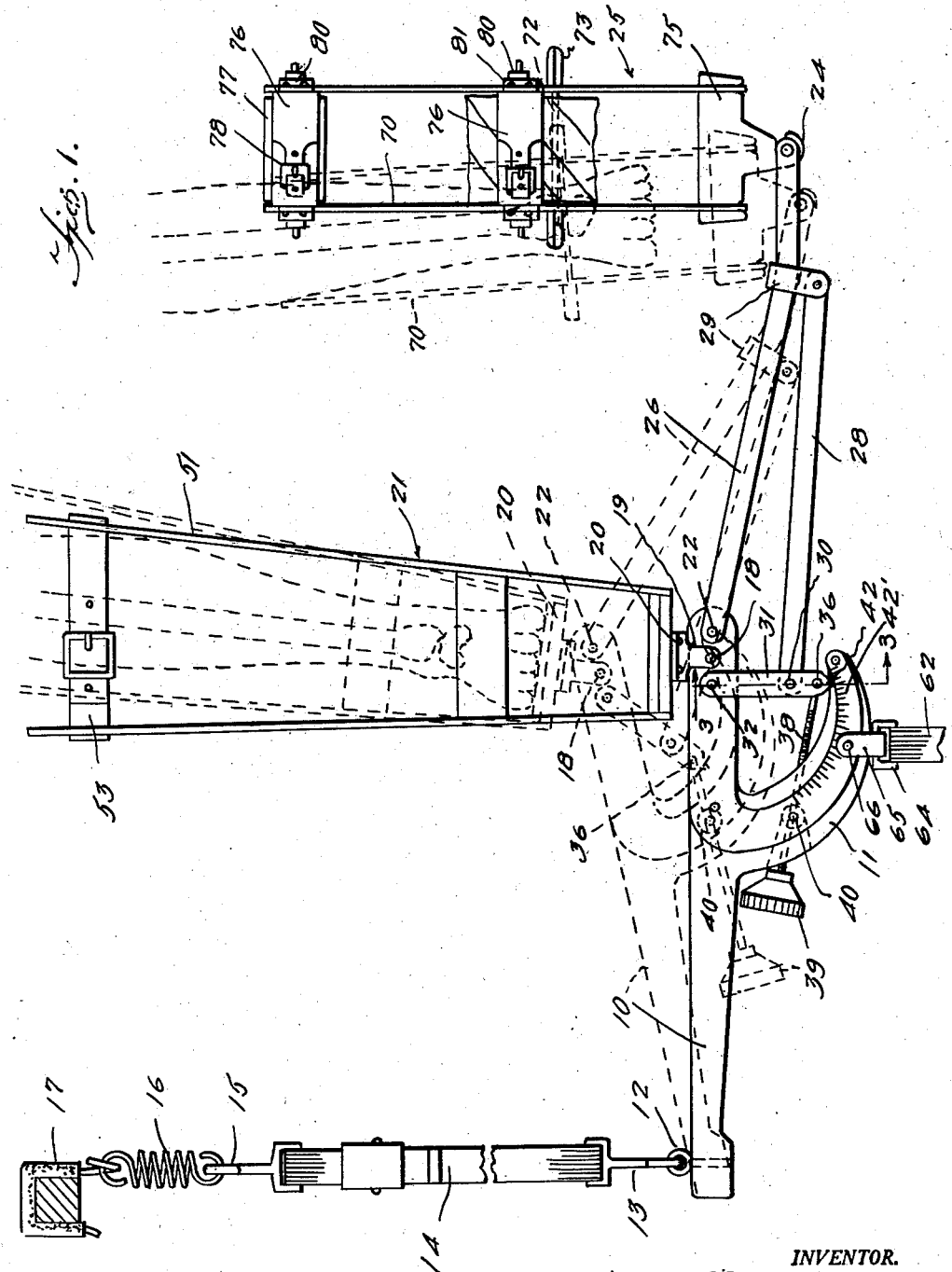

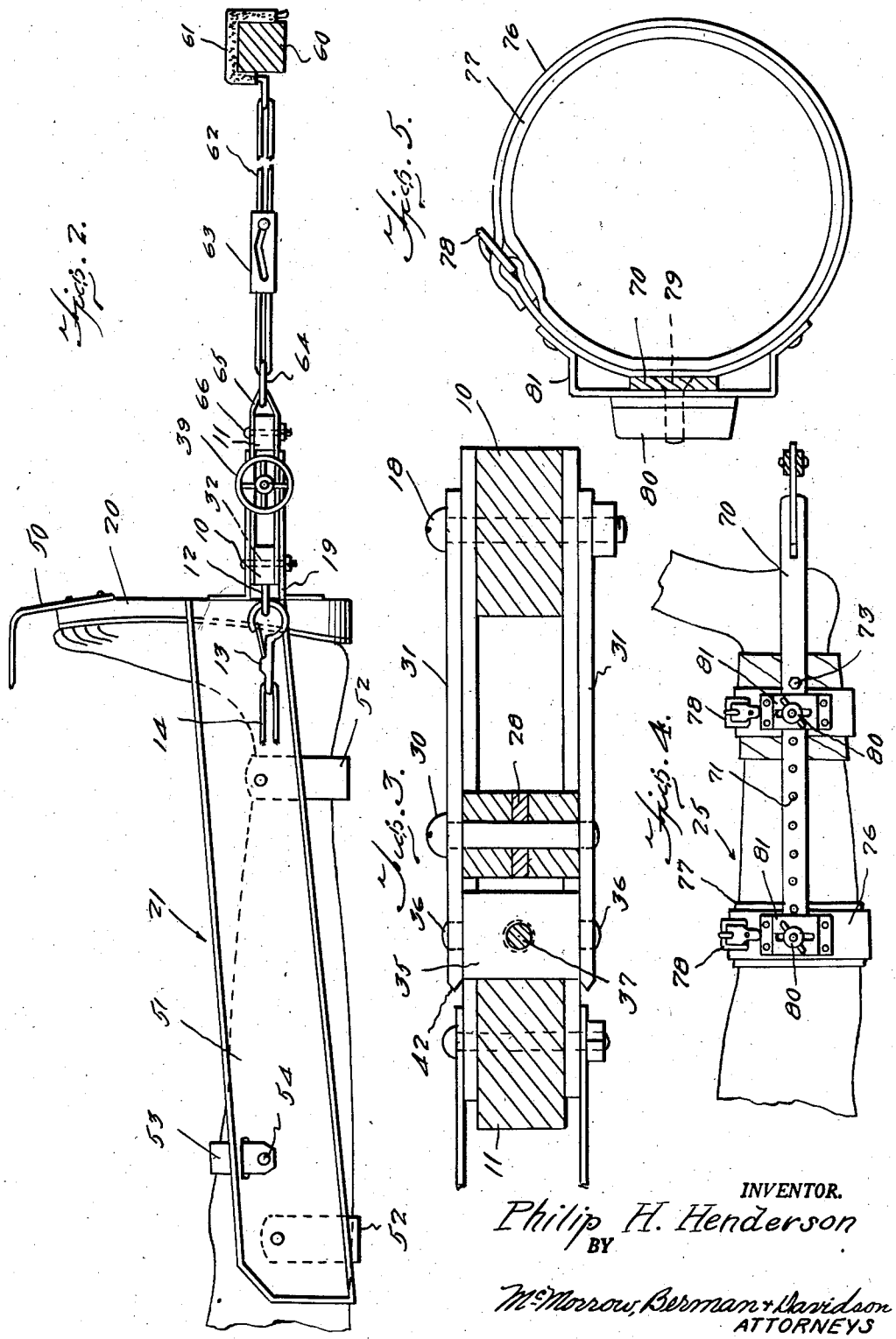

2,454,319

UNITED STATES PATENT OFFICE 2,454,319

TRACTION SPLINT

Philip Harry Henderson, Los Angeles, Calif.

Application May 13, 1947, Serial No. 747,688

5 Claims. (Cl. 128—84)

This invention relates to a traction splint, and more particularly to that type of splint adapted for the reduction of fractures occurring to the bones of the pelvis or legs of a human body.

A primary object of this invention is the provision of an improved traction splint characterized by means whereby the sound leg of an individual, adapted as an anchor for sustaining the traction applied by the splint to the injured leg, may be removed from the splint for bathing or the like, without injury to the injured leg.

A further object of the invention is the provision of such a construction which will be relatively comfortable to the uninjured leg, permitting limited movement thereof, and obviating the necessity for placing the sound leg in a cast.

A further object of the invention is the provision of such a construction which may be readily adjusted to varying tensions, and provided with indicating means whereby such tensions may be accurately measured.

Still other objects reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 1 is a top plan view of one form of traction splint embodying features of the instant inventive concept, an alternative position of adjustment thereof being indicated in dotted lines.

Figure 2 is a side elevational view of the portion of the device adapted to be applied to the sound leg of the patient.

Figure 3 is an enlarged sectional view taken substantially along the line 3—3 of Figure 1, as viewed in the direction indicated by the arrows.

Fiugre 4 is a side elevational view of that portion of the splint applied to the injured leg of the patient.

Figure 5 is an enlarged end elevational view through one of the securing means for the device, the splint associated therewith being shown in section.

Similar reference characters refer to similar parts thorughout the several views of the drawings.

Referring now to the drawings in detail, and more particularly to Figure 1, the device of the instant invention comprises a main or jack bar 10, provided at an intermediate point with an arcuate extending tongue 11. One end of the jack bar 10 is provided with an eye bolt 12, to which is adapted to be secured a buckle 13 comprising the extremity of a strap 14, the opposite end of which is provided with a buckle 15 engaging a coil spring 16 secured to a bed post-engaging hook 17, the latter being adapted to engage the bed post at the head of the patient's bed. The opposite end of the jack bar 10 is pilvotally secured, as by a pivot 18, to a bracket 19, secured to the foot plate 20 of a sound leg-engaging splint, generally indicated at 21 and to be more fully described hereinafter. Pivotally secured to the extremity of bar 10, as by a pivot 22, is a traction bar 26, which extends to a hook 24, which comprises the extremity of an injured leg-engaging splint 25, also to be more fully described hereinafter.

A traction pressure bar 28 is linked, as by a pivoted link 29, to traction bar 26, and at its opposite end pivoted, as by a pivot 30, to a pointer arm 31, one end of which is secured, as by a pivot 32, to jack bar 10 at a point adjacent pivot 18.

As best shown in Figure 3, it will be seen that the pointer 31 comprises a pair of spaced plates, between the extremities of which, and beyond the pivot 30, is journaled for rotation a cylinder 35, provided with stub axles 36 which extend through suitable apertures in the spaced plates 31. The cylinder 35 serves to anchor the smooth end 37 of a jack screw 38 threaded throughout substantially its entire length, which is adapted to engage suitable threads in a cylinder 40 suitably mounted in an aperture in arcuate portion 11 of jack bar 10. The outer extremity of the threaded member 38 is provided with an adjusting knob 39 to permit rotation thereof. A suitable graduated scale 42' is provided along the arcuate portion 11 adjacent the path of travel of pointer 42 comprising the extremity of pointer member 31.

From the foregoing, the operation of that portion of the mechanism so far described should be readily understandable. The splint 21 is affixed to the patient's sound leg, and the splint 35 to the injured leg, all in a manner to be more fully described hereinafter, whereupon, upon anchoring of the strap 14 and its associated mechanism, the sound leg will serve as an anchor for the injured leg. The degree of traction may be readily varied by rotation of the knob 39, which, it is to be understood, will vary the adjustment of parts due to the pivotal arrangement previously described from substantially the position shown in dotted lines to that shown in full lines, thus varying the tractive force exerted, to the necessities of the individual case.

Referring now to the sound leg splint 21, as best shown in Figure 2, it will be seen that the device comprises the previously mentioned foot plate 20 of a length and so shaped as comfortably to conform to the sole of the foot, and preferably provided with a cover guard 50. Attached on opposite sides of the sole plate 20 are two longitudinally extending splint members 51, which extend substantially to the patient's knee, between which are secured arcuate leg-supporting members 52. Since the main pressure exerted by the sound leg is against the foot plate 20, a single strap 53 provided with suitable buckles 54 is sufficient to hold the parts in related assembly. It will thus be seen that limited movement is permitted to the patient's sound limb, and, when the traction splint is secured in a manner to be more fully described hereinafter, the leg may be removed for massage, exercise, bathing, or the like. When it is desired to remove the sound leg of the patient from the splint 21, the traction splint is adapted to be secured to a suitable transverse member 60, such as the lower frame of a bed, by means of a hook member 61, secured to a strap 62, provided with an adjusting buckle 63, the eye 64 at the end of the strap engaging a clevis 65 pivotally mounted, as on a bolt-and-nut connection 66 secured to the arcuate portion 11 of the jack member 10.

The splint member for the injured leg comprises a pair of oppositely disposed metallic splints 70, each provided with a plurality of spaced apertures 71, in a selected pair of which is adapted to be positioned a bone pin 72 provided at its extremities with clamps 73, in order to afford skeletal traction on the injured limb. The splint members 70 extend a substantial distance beyond the foot of the patient, and are suitably secured to an end plate 75, which terminates in the hook 24 previously mentioned as engaging the extremity of the traction bar 26. The splint members are adapted to be secured in position by a pair of straps 76, each provided interiorly with a bandage 77, to prevent chafing of the leg, and the straps being provided with buckles 78. Suitable bolts 79 extending through the previously-discussed apertures 71 in splint member 70 and through a bracket 81 are engaged exteriorly by clamping nuts 80 of conventional design, adapted to secure the splint assembly tightly to the injured leg.

From the foregoing, it will now be seen that there is herein provided an improved traction splint, which obviates the necessity of placing the uninjured leg in a cast, thus providing enhanced comfort for the patient, provided with means whereby the splint may be secured to permit the uninjured leg to be removed for bathing or the like, which accomplishes all the objects of this invention, and others, including many advantages of great practical utility.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a traction splint, an injured leg-engaging splint including a bone pin, a traction bar pivotally secured to the extremity of said splint, a jack bar pivotally secured to the other end of said traction bar, a sound leg-engaging boot pivotally secured to said jack bar, an offset portion extending from said jack bar, a cylinder having a radial threaded bore therethrough pivoted in said offset portion, a jack screw engaging in said bore, a link pivotally secured to the extremity of said jack screw, a pivotal connection between the other end of the link and said jack bar, a traction pressure bar pivotally secured at one end to an intermediate portion of said link and at the other end to said traction bar, and means for securing the free end of said jack bar.

2. In a traction splint, an injured leg-engaging splint including a bone pin, a traction bar pivotally secured to the extremity of said splint, a jack bar pivotally secured to the other end of said traction bar, a sound leg-engaging boot pivotally secured to said jack bar, an offset portion extending from said jack bar, a cylinder having a radial threaded bore therethrough pivoted in said offset portion, a jack screw engaging in said bore, a link pivotally secured to the extremity of said jack screw, a pivotal connection between the other end of the link and said jack bar, a traction pressure bar pivotally secured at one end to an intermediate portion of said link and at the other end to said traction bar, and means for securing the free end of said jack bar, said link terminating in a pointer and an indicating scale on said offset portion adjacent said pointer.

3. In a traction splint, an injured leg-engaging splint including a bone pin, a traction bar pivotally secured to the extremity of said splint, a jack bar pivotally secured to the other end of said traction bar, a sound leg-engaging boot pivotally secured to said jack bar, an offset portion extending from said jack bar, a cylinder having a radial threaded bore therethrough pivoted in said offset portion, a jack screw engaging in said bore, a link pivotally secured to the extremity of said jack screw, a pivotal connection between the other end of the link and said jack bar, a traction pressure bar pivotally secured at one end to an intermediate portion of said link and at the other end to said traction bar, means for securing the free end of said jack bar, and supplemental hook means extending from said offset portion adapted to secure the assembly when the sound leg is removed from its associated boot.

4. In a traction splint, an injured leg-engaging splint including a bone pin, a traction bar pivotally secured to the extremity of said splint, a jack bar pivotally secured to the other end of said traction bar, a sound leg-engaging boot pivotally secured to said jack bar, an offset portion extending from said jack bar, a cylinder having a radial threaded bore therethrough pivoted in said offset portion, a jack screw engaging in said bore, a link pivotally secured to the extremity of said jack screw, a pivotal connection between the other end of the link and said jack bar, a traction pressure bar pivotally secured at one end to an intermediate portion of said link and at the other end to said traction bar, and means for securing the free end of said jack bar, said boot including a foot-pressure plate, side plates secured to said foot plate and strap means securing the side plates to the sound leg.

5. In a traction splint, an injured leg-engaging splint including a bone pin, a traction bar pivotally secured to the extremity of said splint, a jack bar pivotally secured to the other end of said traction bar, a sound leg-engaging boot pivotally secured to said jack bar, an offset portion extending from said jack bar, a cylinder having a radial threaded bore therethrough pivoted in said offset portion, a jack screw engaging in said bore, a link pivotally secured to the extremity of said jack screw, a pivotal connection between the other end of the link and said jack bar, a traction pressure bar pivotally secured at one end to an intermediate portion of said link and at the other end to said traction bar, and means for securing the free end of said jack bar, said last-mentioned means including a strap secured at one end to the free end of said jack bar and at its other end to a spring, and means adapted to secure said spring to a bed post.

PHILIP HARRY HENDERSON.

REFERENCES CITED

The following references are of record in the file of this patent:

UNITED STATES PATENTS

| Number | Name | Date |
|---|---|---|
| 2,200,407 | Anderson | May 14, 1940 |